United States Patent
Silverstein et al.

(10) Patent No.: US 8,016,422 B2
(45) Date of Patent: Sep. 13, 2011

(54) ETENDUE MAINTAINING POLARIZATION SWITCHING SYSTEM AND RELATED METHODS

(75) Inventors: Barry D. Silverstein, Rochester, NY (US); Joseph R. Bietry, Rochester, NY (US); Robert Metzger, Fairport, NY (US); Gary E. Nothhard, Hilton, NY (US); Richard P. Corey, Rush, NY (US)

(73) Assignee: Eastman Kodak Company, Rochester, NY (US)

( * ) Notice: Subject to any disclaimer, the term of this patent is extended or adjusted under 35 U.S.C. 154(b) by 343 days.

(21) Appl. No.: 12/259,307

(22) Filed: Oct. 28, 2008

(65) Prior Publication Data

US 2010/0103519 A1 Apr. 29, 2010

(51) Int. Cl.
*G03B 21/14* (2006.01)

(52) U.S. Cl. .......................................... 353/20

(58) Field of Classification Search .......... 359/462–465, 359/485–487, 495–496, 196.1–226.2; 348/42, 348/54, 58; 353/8, 20
See application file for complete search history.

(56) References Cited

U.S. PATENT DOCUMENTS

| | | | |
|---|---|---|---|
| 4,441,791 A | 4/1984 | Hornbeck | |
| 4,794,584 A * | 12/1988 | Hamer et al. | 369/44.14 |
| 5,535,047 A | 7/1996 | Hornbeck | |
| 5,600,383 A | 2/1997 | Hornbeck | |
| 5,808,795 A | 9/1998 | Shimomura et al. | |
| 5,907,437 A | 5/1999 | Sprotbery et al. | |
| 6,231,192 B1 * | 5/2001 | Konno et al. | 353/69 |
| 6,531,677 B2 * | 3/2003 | Arai et al. | 219/121.71 |
| 6,793,341 B2 | 9/2004 | Svardal et al. | |
| 7,116,017 B2 * | 10/2006 | Ji et al. | 310/23 |
| 2003/0058534 A1 | 3/2003 | Scott et al. | |
| 2003/0151834 A1 * | 8/2003 | Penn | 359/833 |
| 2004/0067016 A1 | 4/2004 | Anikitchev et al. | |
| 2006/0219879 A1 | 10/2006 | Katou et al. | |
| 2006/0291053 A1 | 12/2006 | Robinson et al. | |
| 2007/0085936 A1 * | 4/2007 | Callison et al. | 348/744 |
| 2007/0127121 A1 | 6/2007 | Maximus et al. | |
| 2008/0002201 A1 | 1/2008 | Morita | |
| 2009/0141242 A1 * | 6/2009 | Silverstein et al. | 353/20 |
| 2009/0284713 A1 | 11/2009 | Silverstein et al. | |
| 2010/0007852 A1 * | 1/2010 | Bietry et al. | 353/8 |

FOREIGN PATENT DOCUMENTS

WO   WO 2008/076103 A1   6/2008

OTHER PUBLICATIONS

Photonics Dictionary—Definition for etendue [online]. Laurin Publishing Co., n.d. [retrieved on Jan. 21, 2011]. Retrieved from the Internet: <URL: www.photonics.com/Directory/Dictionary/Definition.aspx?type=2&DictionaryID=3895>.*

(Continued)

*Primary Examiner* — Alessandro Amari
*Assistant Examiner* — Kimberly N Kakalec
(74) *Attorney, Agent, or Firm* — Kevin E. Spaulding

(57) ABSTRACT

Etendue maintaining polarization switching occurs, according to various embodiments, with a mirror that quickly transitions between two positions. Light having uniform polarization is transmitted to the mirror. Light reflected off of the mirror in one of the two positions has its polarization changed, whereas light reflected off of the mirror in the other of the two positions has its polarization maintained. Thereafter, the polarization-changed light and the polarization-maintained light easily may be recombined in an etendue-maintaining manner. Because the recombined light includes two different polarization states, stereoscopic images may be generated.

8 Claims, 5 Drawing Sheets

OTHER PUBLICATIONS

H. Murat et al., "Increased lumens per étendue by combining pulsed LED's" Proceedings of the SPIE—The International Society for Optical Engineering, SPIE, US, vol. 5740, Apr. 1, 2005, pp. 1-12, XP007900826, ISSN: 0277-786X.

B. D. Silverstein, et al., "Stereo Projection Apparatus Using Polarized Solid State Light Sources", U.S. Appl. No. 12/036,385 (D-94569) filed Feb. 25, 2008.

* cited by examiner

ETENDUE MAINTAINING POLARIZATION SWITCHING SYSTEM AND RELATED METHODS

CROSS-REFERENCE TO RELATED APPLICATION(S)

This application is related to prior U.S. patent application Ser. No. 12/036,385, filed Feb. 25, 2008, and is also related to U.S. patent application Ser. No. 12/259,326, filed Oct. 28, 2008, and a title of "Polarization Maintaining Optical Integration" by Gary Nothhard et al. The entire disclosure is hereby incorporated herein by reference in its entirety.

FIELD OF THE INVENTION

The present invention relates to optical systems that maintain etendue.

BACKGROUND

An existing optical system 45 is described with respect to FIG. 1. In system 45, light from one or more substantially polarized solid state light sources 44a, 44b are combined by beam combiners 30. The combined light from sources 44a is subsequently rotated by retardation plate 64 such that its polarization is orthogonal to the combined light from sources 44b. The orthogonally polarized combined light from sources 44a and 44b next impinge upon rotating disk 65, which contains at least one segment that is transmissive and one that is reflective to the light. In one case, whereby disk 65 is rotated such that the reflective segment encounters the combined light from sources 44a and 44b, the combined light from sources 44a will be directly reflected onto the optical axis 3 and directed toward lens 50 for either optical integration (not shown) or illumination of the remaining optical system (not shown). The combined light from sources 44b, however, will be redirected to reflective surface 72 and further passed through retardation plate 64, which rotates the polarization to substantially the same state as the combined light from sources 44a. The light exiting retardation plate 64 is substantially directed onto a similar optical path of the combined light from sources 44a and is sent through lens 50.

In the alternative case, whereby disk 65 is rotated such that the transmissive segment is in the path of the combined light from sources 44a and 44b, the situation is reversed such that the combined light from sources 44a is redirected and rotated to the polarization state of the combined light from sources 44b before both are sent to lens 50. In this case, the rotating segmented disk 65 alternately delivers two orthogonal states of polarization to lens 50 for use in an optical system.

The system 45, however, exhibits increased etendue 2, which may not be preferable in certain applications. Accordingly, a need in the art exists for an optical system, such as system 45, that exhibits maintained etendue.

SUMMARY

The above-described problem is addressed and a technical solution is achieved in the art by an etendue maintaining polarization switching system and related methods according to various embodiments of the present invention. In some embodiments, an etendue maintaining polarization switching system includes a laser illumination system providing polarized light along a first light path. The system also includes a pivoted reflective element disposed in the first light path that alternatively directs the polarized light in the first light path, without changing its polarization, along at least a second light path and a third light path under the control of a rotation device and a driving device. A retarder disposed in the second light path changes the polarized light into light having a different polarization along the second light path. In some embodiments, a reflective element is disposed in the third light path upstream of the polarization combining device. A polarization combining device combines light from the third light path with the light having the different polarization from the retarder in the second light path into a single light beam exhibiting a same or substantially a same etendue as the first light path.

In some embodiments, a rotation device and a driving device collectively cause the pivoting of the pivoted reflective element. In some of these embodiments, the driving device provides the rotation device with a driving signal, the driving signal causing the rotation device to pivot the pivoted reflective element. In some embodiments, the driving signal is configured to include noise, whether random or otherwise. Such noise may be configured to reduce laser speckle.

In some embodiments, the pivoted reflective element includes an optical surface that slightly deforms when the rotation device and the driving device move the reflective element. Such deformation may occur due to acceleration, deceleration, or both, when the reflective element is moved by the rotation device and the driving device. Such a deforming optical surface may be configured to reduce speckle in addition to or in lieu of the use of noise to reduce speckle.

Some embodiments of the present invention include a reflective retarding system disposed in the third light path as opposed to a retarder in the second light path used in some other embodiments. The reflective retarding system changes the polarized light into light having a different polarization and reflects the light having the different polarization along the third light path.

In some embodiments, any of the etendue maintaining polarization switching systems according to the present invention may be included in a projection system. Such projection system may or may not be a stereoscopic projecting system configured to generate stereoscopic images. In some of these embodiments, the projection system includes optics supporting the etendue maintaining polarization switching system and a projection assembly.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION

Various embodiments of the present invention pertain to polarization switching while maintaining etendue. The polarization switching, according to some embodiments, occurs with a mirror that quickly transitions between two positions. Light having uniform polarization is transmitted to the mirror. Light reflected off of the mirror in one of the two positions has its polarization changed, whereas light reflected off of the mirror in the other of the two positions has its polarization maintained. Thereafter, the polarization-changed light and the polarization-maintained light easily may be recombined in an entendue-maintaining manner. Because the recombined light includes two different polarization states, stereoscopic images may be generated.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting.

Further, it should be noted that, unless otherwise explicitly noted or required by context, the word "or" is used in this disclosure in a non-exclusive sense. Further still, although this description often uses the term "light", one skilled in the art will appreciate that other forms of radiation may be used in various embodiments of the present invention.

Figure 1:
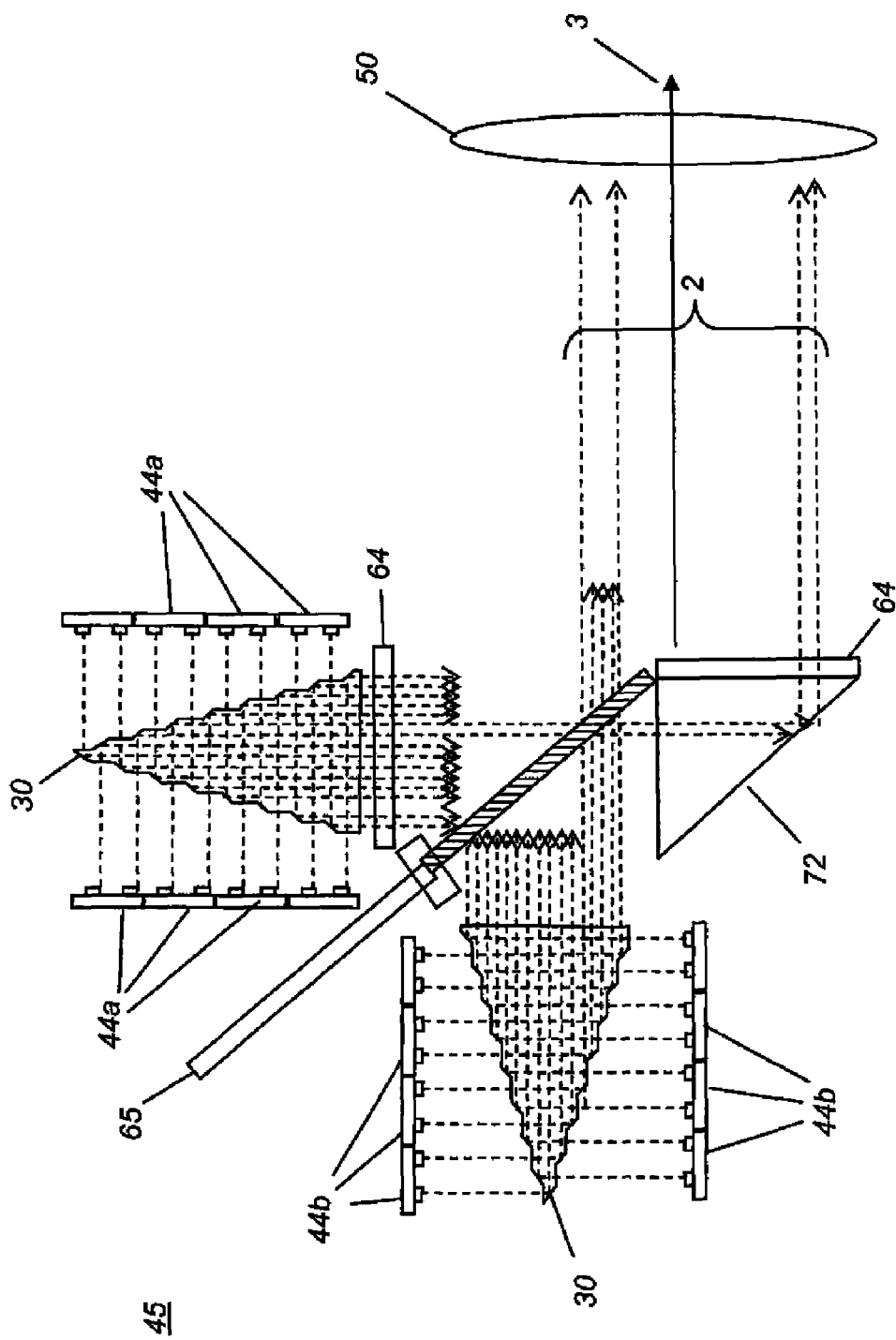
FIG. 1 illustrates an existing optical system that increases etendue.
Figure 2:
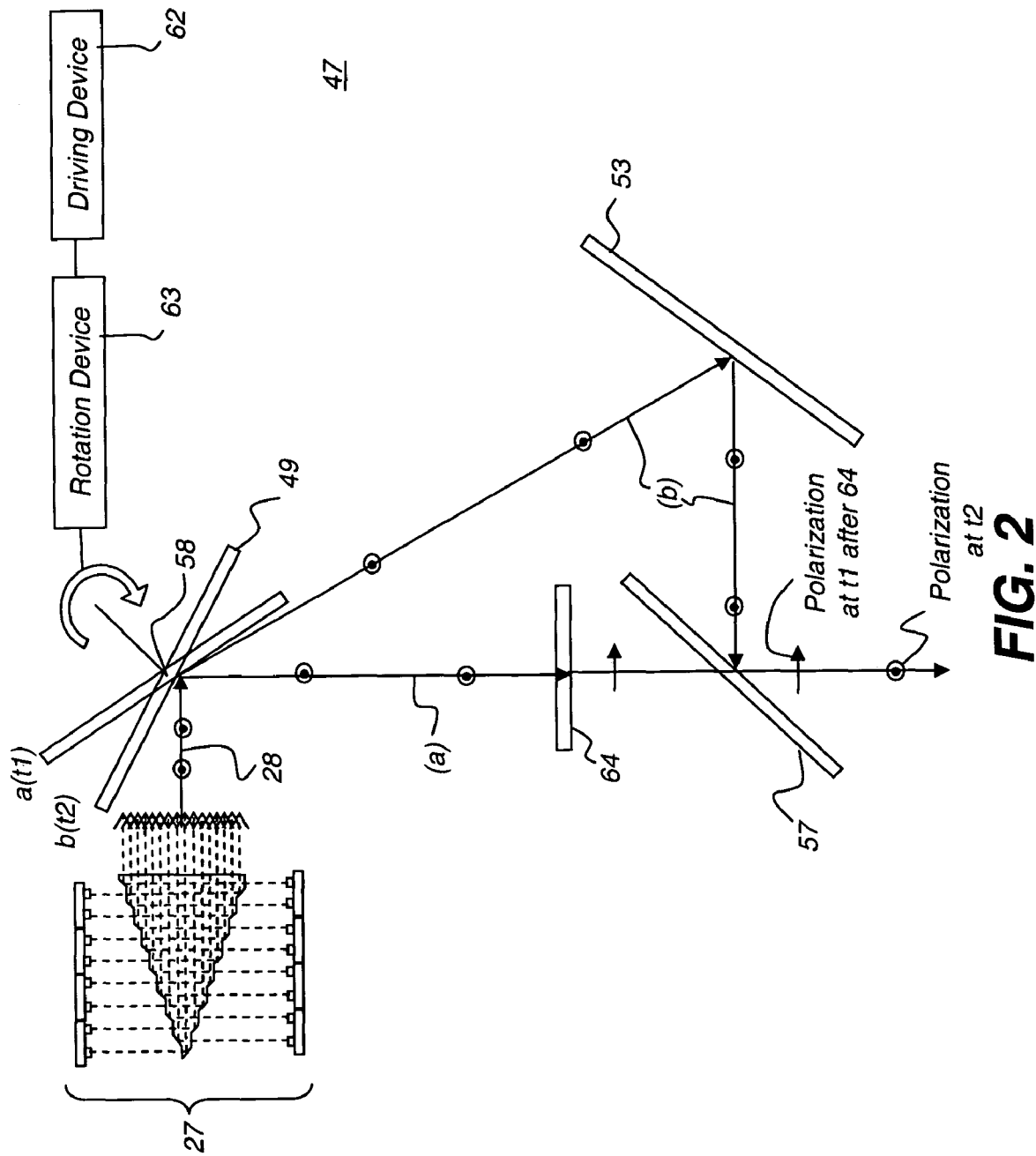
FIG. 2 illustrates an etendue maintaining polarization switching system, according to an embodiment of the present invention.

FIG. 2 illustrates an etendue maintaining polarization switching system 47, according to an embodiment of the present invention. In FIG. 2, the system 47 includes a laser illumination system 27 that contains one or more laser sources directing polarized light along a first light path 28 to a pivoted mirror 49. Although the description herein commonly refers to illumination system 27 as a laser illumination system, any low angular divergence (under approximately 10 degrees) substantially polarized light source may be used. Pivoted mirror 49 may be any type of pivoted reflective element, such as a common mirror, a wavelength tuned mirror, or a thin film, wire grid, or other type of polarization beamsplitter. A polarization beamsplitter may be advantaged in that this surface can effectively be used to enhance the polarization ratio of the laser sources. Common laser sources emit polarization ratios of approximately 100:1. If a higher extinction is desired, a polarization beamsplitter my be used to transmit the leakage polarization state, while reflecting nearly all of the higher ratio polarized light.

Mirror 49 may be mounted to a rotation device 63, which may be, for example, a galvanometer such as that provided by Cambridge Technologies Inc, Lexington, Mass., a pivot devise driven by a cam gear on a motor, a pivot bearing driven by voice coil, piezo-electric motor or other linear or rotary motor. The rotation device 63 may be driven by a driving device 62 that provides, for example, electric current to cause a motor in the rotation device 63 to operate and, thus, move the mirror 49. In this regard, a primary purpose of rotation device 63 is to cause the mirror 49 to be rotated about a pivot point 58 to two or more substantially fixed positions (e.g., a(t1), b(t2)) with a minimal transition time (delta t) between the fixed positions.

In the example of FIG. 2, mirror position a(t1) at time t1 directs the polarized light beam to a second light path (a) containing optical retarder 64 and subsequently polarization beamsplitter 57. The optical retarder 64 is configured to change the polarization of the polarized light from the laser illumination system 27. In the case where the polarization switching of the laser light is desired to be orthogonal, optical retarder 64 would provide substantially a half wave rotation. Polarization beamsplitter 57 is an example of a polarization combining device that is designed to transmit the light having the different polarization (e.g., the orthogonal polarization) from the retarder 64. It should be noted, however, that polarization beamsplitter 57 or any other polarization combining device used in its place may instead be designed to reflect the light having the different polarization (e.g., the orthogonal polarization) instead. In this case, which is the opposite of that shown in FIG. 2, the mirror 53, discussed below, may instead be a device that causes a half-wave rotation in the light along path (b).

Returning to the embodiment represented in FIG. 2, after the mirror is in position a(t1), rotation device 63 transitions mirror 49 during minimized time delta t to position b(t2). In this regard, the rotation device 63 may be driven either by electronic command or motor timing. Once the mirror 49 is in position b(t2), the mirror 49 redirects the light from laser illumination system 27 to a third light path (b). The light along path (b) travels to a mirror 53. The mirror 53 can be a conventional mirror, tuned mirror or polarization beamsplitter, just like mirror 49. Mirror 53 directs the laser light to polarization beamsplitter 57 to be combined into the same or substantially the same optical path as the laser light from paths 28 and (a). In other words, the combined light beam from beamsplitter 57 exhibits an etendue that is the same or is substantially the same as the etendue exhibited by light along paths 28 and (a). Note that the combined angles from the repositioned mirror 49 from (a) to (b) along with the angular position of mirror 53, direct the laser light via reflection such that upon reflection off of beamsplitter 57 the light beams of path (a) and path (b) substantially coincide in both an angular and spatial sense. There may be a desire, however, to keep the path lengths short such that the small laser divergence does not cause a significant size difference between the two optical paths, as they are unequal. In this case, the system etendue is substantially preserved.

In one embodiment that will enable orthogonal polarization states for stereo imaging, polarization beamsplitter will deliver one polarization state at (t1) and an orthogonal polarization state at (t2) to an optical system that will substantially maintain these polarization states to the viewer. The viewer then discriminates between the different images shown at (t1) and (t2) by orthogonal polarizing filters over each eye. It is desirable to minimize the transition time delta t in order to decrease either crosstalk of polarization states where the wrong image signal is sent to the opposing eye. Likewise, when a blanked image (no image is used during the transition time), a minimal amount of light is lost.

Figure 3:
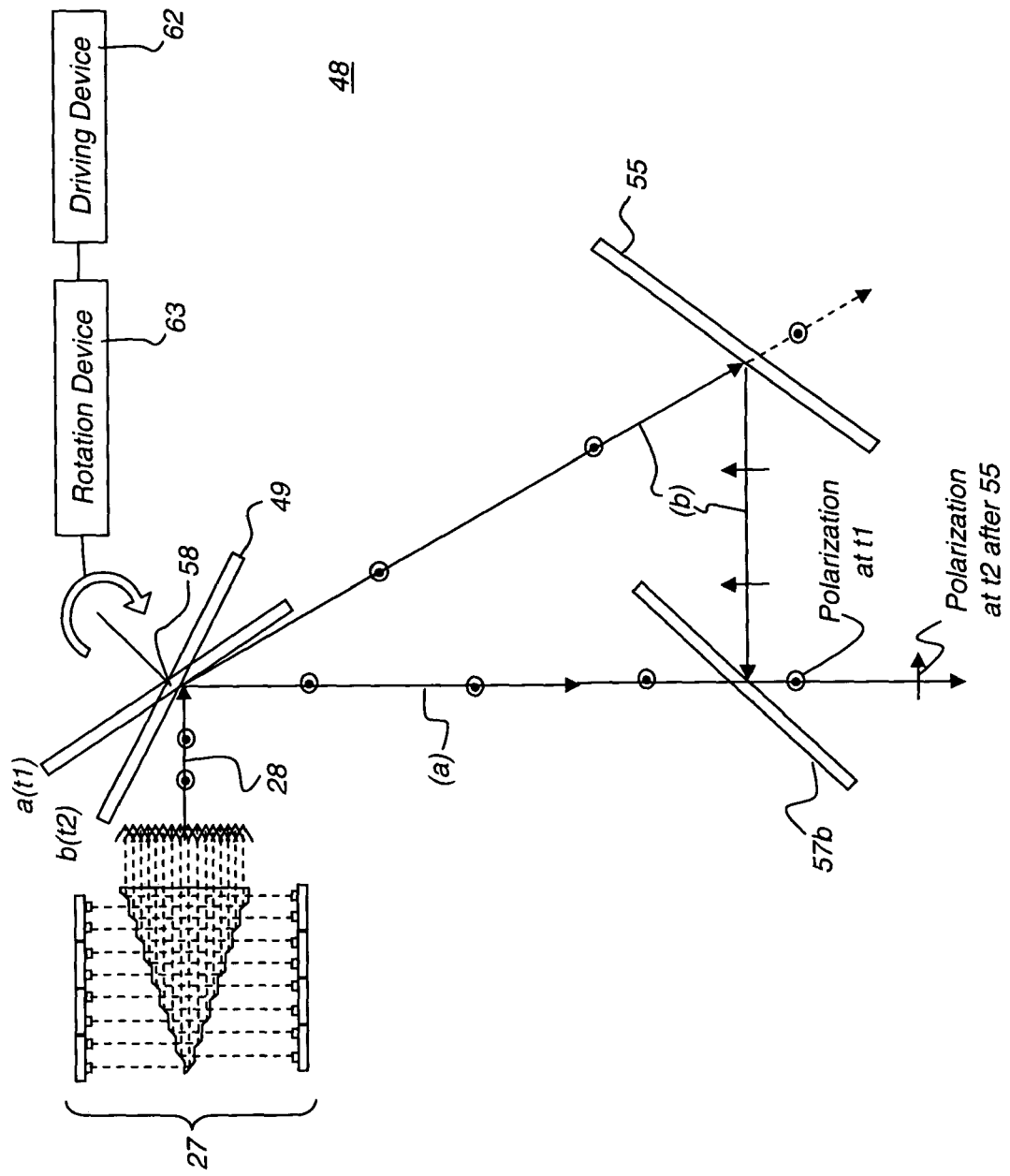
FIG. 3 illustrates another etendue maintaining polarization switching system, according to an embodiment of the present invention.

FIG. 3 illustrates an etendue maintaining polarization switching system 48, according to an embodiment of the present invention. The system 48 is similar to the system 47 illustrated by FIG. 2, except that the system 48 does not include the optical retarder 64 in FIG. 2, and the mirror 53 in FIG. 2 is replaced by a reflective retarding system 55 that both reflects and rotates the polarization state of the light. The reflective retarding system 55 may be a single reflective retarder (as shown in FIG. 3), known in the art, may be a reflector and a retarder in series (not shown in FIG. 3), or may be any other equivalent device or combination of devices.

In the example of FIG. 3, the polarization beamsplitter 57b transmits the original laser polarization state and reflects the rotated polarization state from path (b). It should be noted that, if etendue maintenance is not a concern, the mirror 53 may be tilted in such a way, not shown, that downstream portion of path (b) is reflected in a direction parallel to path (a).

Figure 4:
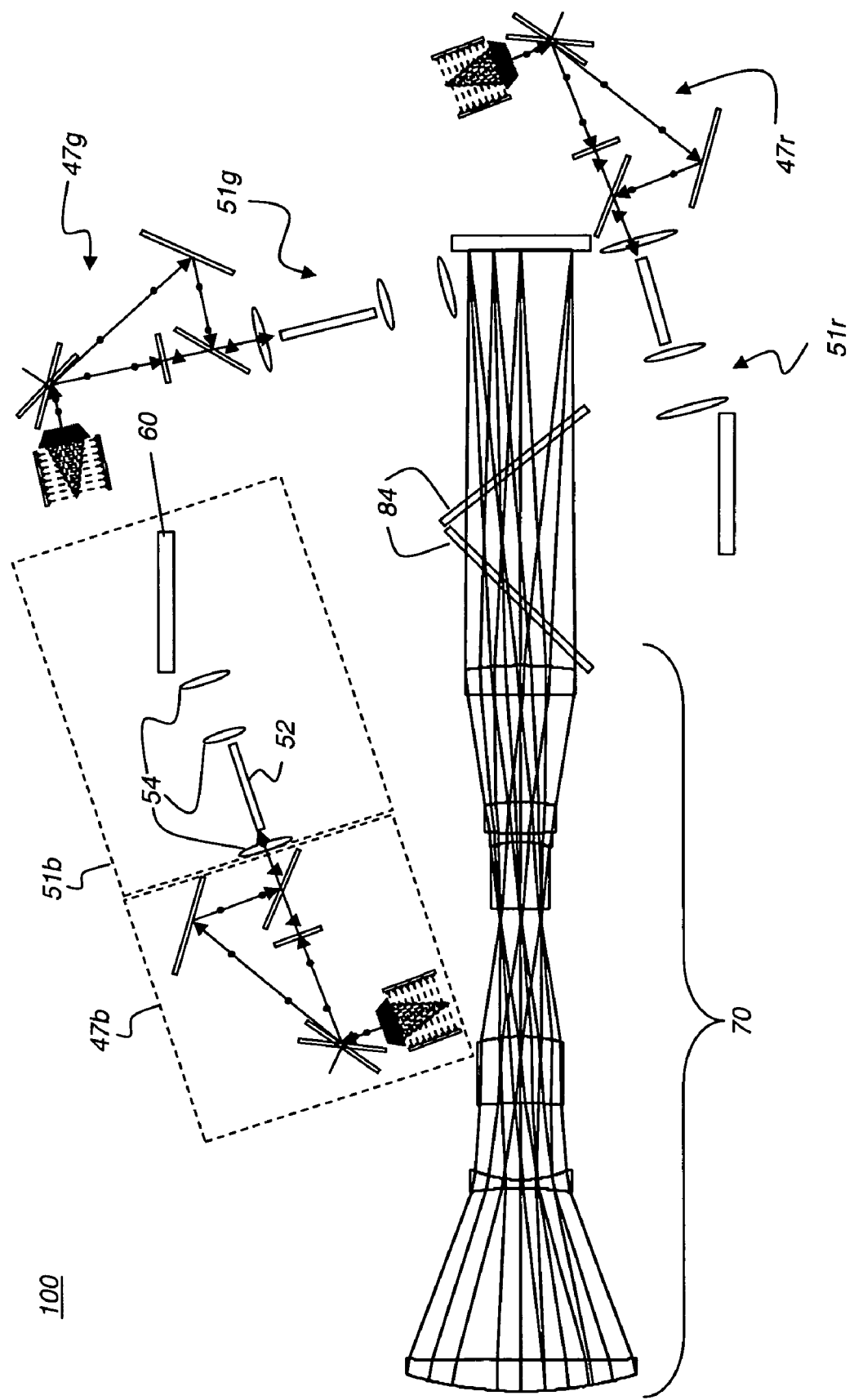
FIG. 4 illustrates a projection system incorporating the etendue maintaining polarization switching system of FIG. 2, according to an embodiment of the present invention.

FIG. 4 illustrates a projection system 100 incorporating etendue maintaining polarization switching systems 47 (47r, 47g, 47b) of FIG. 2 for each color channel (red, green, blue, respectively, for example), according to an embodiment of the present invention. It should be noted that, although the system 100 is shown using systems 47 of FIG. 2, one skilled in the art will appreciate that the system 100 may instead include systems 48 of FIG. 3 or systems from other embodiments of the present invention. Further, although the example of FIG. 4 involves red, green, and blue color channels, one skilled in the art will appreciate that different numbers and types of color channels may be used.

Associated with each switching system 47r, 47g, 47b, are supporting optics 51r, 51g, 51b, respectively. Each set of supporting optics 51 includes an integrating bar 52, a spatial light modulator 60, and various lenses 54 configured to couple the light into integrating bar 52 and subsequently resize and image the uniformized illumination exiting the integrating bar onto spatial light modulator 60. The colored light from switching systems 47r, 47g, 47b and supporting optics 51r, 51g, 51b, respectively, are combined with dichroic plates 84, known in the art. The combined light from dichroic plates 84 are projected by a projection assembly 70, which includes several lenses in a configuration known in the art.

Figure 5:
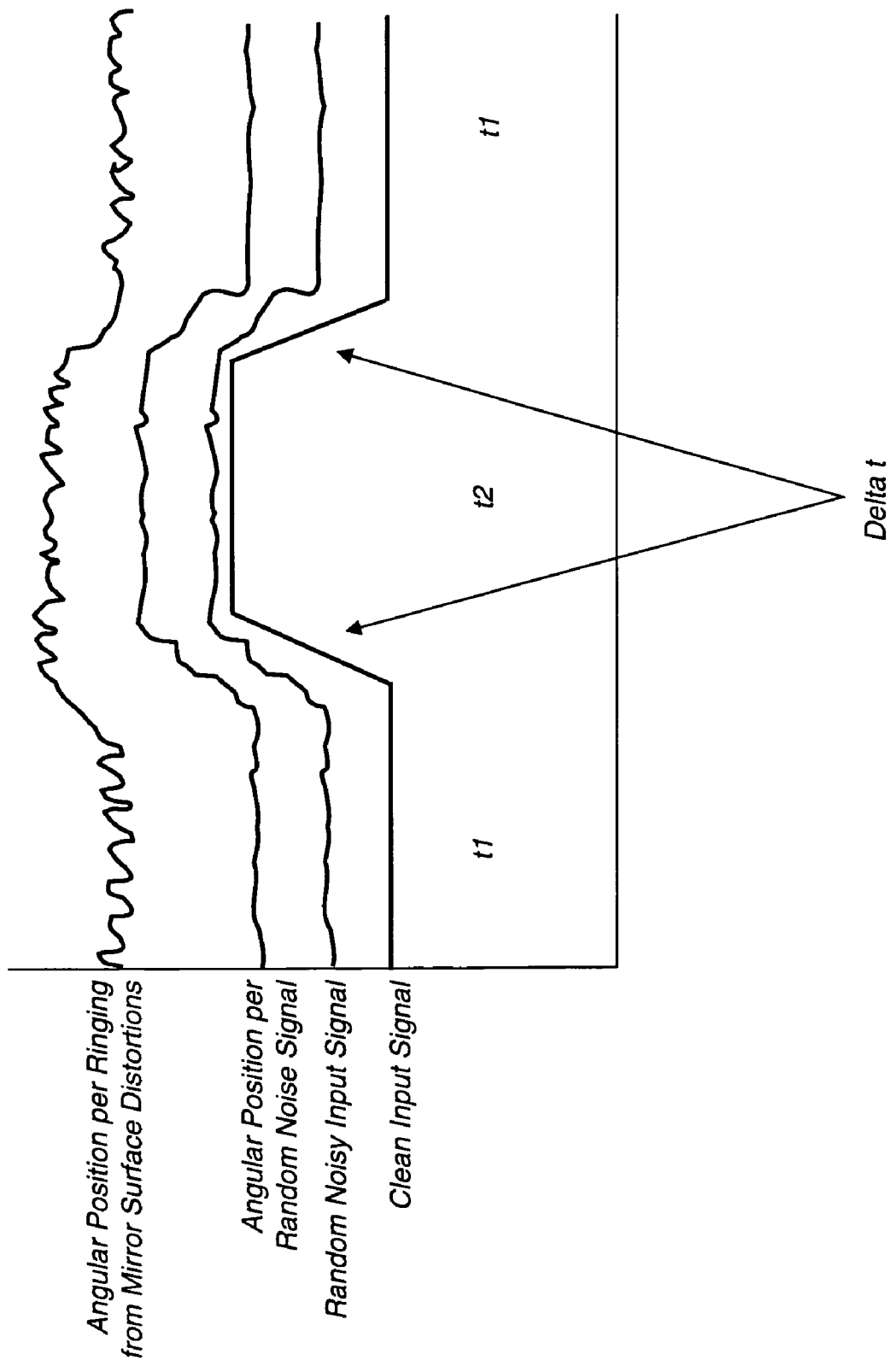
FIG. 5 illustrates intentionally caused vibrations in angular position of a rotating mirror, according to embodiments of the present invention.

FIG. 5 illustrates intentionally caused vibrations in angular position of a rotating mirror, according to embodiments of the present invention. As an additional feature to various embodiments of the present invention, such as the embodiments of FIGS. 2, 3, and 4, mirror 49 may be caused to vibrate in order to reduce laser speckle, known in the art. In this regard, FIG. 5 shows that rotational device 63 may be driven by a randomly noisy input signal (as opposed to the "clean input signal" shown in FIG. 5) from driving device 62 that causes slight angular motion of mirror 49. This slight angular motion is illustrated by the graph of "Angular Position per Random Noise Signal" in FIG. 5. The noise applied by the driving device 62 to the signal driving the rotational device 63 need not be purely random, however. For example, ordered noise may be provided to the rotation device 63 by the driving device 62.

Intentional angular noise or vibration can be utilized to provide small temporal shifts of the laser illumination beams to the spatial light modulator, thereby causing reduced laser speckle. A desirable frequency domain would be such that the speckle patterns would be averaged over different positions by the eye.

In addition to or in lieu of providing noise in a driving signal of the rotation device 63 to cause vibration in light reflecting off of the mirror 49 to reduce speckle, the mirror 49 may be fabricated or mounted in a manner that would slightly deform the optical surface of the mirror 49 when it moves to cause small optical path differences in the illumination path. In other words, causing slight deformations in the optical surface of the mirror 49 when it moves will cause or facilitate vibrations in light reflected off of the mirror 49 in order to reduce laser speckle. Again the frequency domain of this vibration would be tuned such that the eye averages out the variation in speckle patterns to reduce the viewable speckle intensities. The acts of acceleration and deceleration of the mirror 49, when it transitions from one position to another (see FIG. 2, for example), may be used to provide the forces that cause the slight deformations in the optical surface of the mirror 49. Typically in a galvanometer, this effect is called ringing and is illustrated at the top row of FIG. 5. In this case, ringing may be a desirable attribute as a means of speckle reduction.

In addition to causing vibrations in the mirror 49 or in the optical surface of the mirror 49, or both, the mirror may contain a diffusive surface in order to further enhance laser speckle reduction.

It is to be understood that the exemplary embodiments are merely illustrative of the present invention and that many variations of the above-described embodiments can be devised by one skilled in the art without departing from the scope of the invention. It is therefore intended that all such variations be included within the scope of the following claims and their equivalents.

PARTS LIST 27 laser illumination system
28 first light path
47 etendue maintaining polarization switching system
47b switching systems
47g switching systems
47r switching systems
48 etendue maintaining polarization switching system
49 pivoted mirror
51 supporting optics
51b supporting optics
51g supporting optics
51r supporting optics
52 integrating bar
53 mirror
54 various lenses
55 reflective retarding system
57 polarization beamsplitter
57b polarization beamsplitter
58 pivot point
60 spatial light modulator
62 driving device
63 rotation device
64 optical retarder
70 projection assembly
84 dichroic plates
100 projection system

What is claimed is:

1. An etendue maintaining polarization switching system comprising:
   a laser illumination system configured to provide polarized light along a first light path;
   a pivoted reflective element disposed in the first light path, the pivoted reflective element actuable to controllably and alternatively direct the polarized light in the first light path, without changing its polarization, along at least a second light path and a third light path;
   a rotation device and a driving device collectively configured to pivot the pivoted reflective element, the driving device being configured to provide the rotation device a driving signal configured to cause the rotation device to pivot the pivoted reflective element, wherein the pivoted reflective element includes an optical surface configured to slightly deform when the rotation device and the driving device pivot the pivoted reflective element;
   a retarder disposed in the second light path, the retarder configured to change the polarized light into light having a different polarization along the second light path; and a polarization combining device configured to combine light from the third light path with the light having the different polarization from the retarder in the second light path into a single light beam exhibiting a same or substantially a same etendue as the first light path.

2. The system of claim 1, wherein the driving signal is configured to include noise.

3. The system of claim 2, wherein the noise is random.

4. The system of claim 2, wherein the noise is ordered.

5. The system of claim 1, wherein the optical surface is configured to slightly deform due to acceleration, deceleration, or both, when the pivoted reflective element is moved by the rotation device and the driving device.

6. The system of claim 1, further comprising a reflective element disposed in the third light path upstream of the polarization combining device.

7. A projection system comprising:
  an etendue maintaining polarization switching system comprising:
    a laser illumination system configured to provide polarized light along a first light path;
    a pivoted reflective element disposed in the first light path, the pivoted reflective element actuable to controllably and alternatively direct the polarized light in the first light path, without changing its polarization, along at least a second light path and a third light path;
    a retarder disposed in the second light path, the retarder configured to change the polarized light into light having a different polarization along the second light path; and
    a polarization combining device configured to combine light from the third light path with the light having the different polarization from the retarder in the second light path into a single light beam exhibiting a same or substantially a same etendue as the first light path,
  optics supporting the etendue maintaining polarization switching system; and
  a projection assembly.

8. An etendue maintaining polarization switching system comprising:
  a laser illumination system configured to provide polarized light along a first light path;
  a pivoted reflective element disposed in the first light path, the pivoted reflective element actuable to controllably and alternatively direct the polarized light in the first light path, without changing its polarization, along at least a second light path and a third light path;
  a rotation device and a driving device collectively configured to pivot the pivoted reflective element, the driving device being configured to provide the rotation device a driving signal, wherein the driving signal includes a switching signal configured to cause the rotation device to pivot the pivoted reflective element between a first angular position that directs the polarized light along the second light path and a second angular position that directs the polarized light along the third light path, and wherein the driving signal also includes a noise signal configured to superimpose small angular shifts on the angular position of the pivoted reflective element, and wherein frequency characteristics of the noise signal are such that the human eye will average out variations in any resulting speckle patterns;
  a retarder disposed in the second light path, the retarder configured to change the polarized light into light having a different polarization along the second light path; and
  a polarization combining device configured to combine light from the third light path with the light having the different polarization from the retarder in the second light path into a single light beam exhibiting a same or substantially a same etendue as the first light path.

* * * * *